United States Patent [19]
Stanley

[11] Patent Number: 6,076,853
[45] Date of Patent: Jun. 20, 2000

[54] ALTITUDE/TEMPERATURE COMPENSATION FOR A GAS-FILLED WEIGHT SENSOR

[75] Inventor: James G. Stanley, Novi, Mich.

[73] Assignee: Automotive Systems Laboratory, Inc., Farmington Hills, Minn.

[21] Appl. No.: 09/003,850

[22] Filed: Jan. 7, 1998

Related U.S. Application Data

[60] Provisional application No. 60/065,334, Nov. 13, 1997.

[51] Int. Cl.[7] .................................................. B60R 21/32
[52] U.S. Cl. ......................... 280/735; 180/273; 177/208
[58] Field of Search ........................... 280/735; 180/273; 177/208, 141; 297/DIG. 3

[56] References Cited

U.S. PATENT DOCUMENTS

| | | | |
|---|---|---|---|
| 3,992,946 | 11/1976 | Bradley | 73/407 |
| 4,219,090 | 8/1980 | Dayton | 177/208 |
| 4,957,286 | 9/1990 | Persons, II et al. | 272/73 |
| 4,987,898 | 1/1991 | Sones | 128/645 |
| 5,117,373 | 5/1992 | Huff | 364/550 |
| 5,904,219 | 5/1999 | Anahid et al. | 180/273 |

*Primary Examiner*—Paul N. Dickson
*Attorney, Agent, or Firm*—Lyon, P.C.

[57] ABSTRACT

A plurality of pneumatic hydrostatic weight sensors, each incorporating a fluid and a pressure sensor for sensing the pressure thereof, are incorporated in series with the load path within a vehicle seat to sense occupant weight. A signal processor measures the pressure within each pneumatic hydrostatic weight sensor and the weight of the occupant from the signal generated by the associated pressure sensor, and compensates for the effects of ambient pressure or temperature on the weight measurement responsive to the difference in pressure between the associated pressures of two of the pneumatic hydrostatic weight sensors.

9 Claims, 2 Drawing Sheets

ALTITUDE/TEMPERATURE COMPENSATION FOR A GAS-FILLED WEIGHT SENSOR

CROSS-REFERENCE TO RELATED APPLICATIONS

The instant application claims the benefit of U.S. Provisional Application Ser. No. 60/065,334 filed on Nov. 13, 1997.

Co-pending U.S. application Ser. No. 08/933,701, hereinafter "Application ASL-157-US", entitled "Seat Weight Sensor Having Fluid Filled Bladder", filed on Dec. 18, 1997 claiming benefit of U.S. Provisional Application Serial No. 60/032,380 filed on Dec. 19, 1996, and assigned to the assignee of the instant invention discloses a hydrostatic weight sensor comprising a fluid filled bladder and a pressure sensor for sensing the weight of an occupant in a vehicle seat for controlling a safety restraint system. Application ASL-157-US also discloses a load distributor for distributing loads across the load bearing surface of the hydrostatic weight sensor.

Co-pending U.S. application Ser. No. 09/003,672, hereinafter "Application ASL-161-US", entitled "Automotive Seat Weight Sensing System", filed on Jan. 7, 1998 claiming benefit of U.S. Provisional Application Serial No. 60/034,018 filed on Jan. 8, 1997, and assigned to the assignee of the instant invention discloses a seat weight sensing system comprising a plurality of hydrostatic weight sensors each of which is in accordance with Application ASL-157-US.

Co-pending U.S. application Ser. No. 09/003,870 hereinafter "Application ASL-163-US", entitled "Vehicle Seat Sensor Having Self-Maintaining Air Bladder", filed on Jan. 7, 1998 claiming benefit of U.S. Provisional Application Serial No. 60/035,343 filed on Jan. 16, 1997, and assigned to the assignee of the instant invention discloses an apparatus for automatically maintaining the supply of sensing fluid in a hydrostatic weight sensor.

Co-pending U.S. application Ser. No. 09/003,851, hereinafter "Application ASL-185-US", entitled "Seat Weight Sensor Having Self-Regulating Fluid Filled Bladder", filed on Jan. 7, 1998 claiming benefit of U.S. Provisional Application Serial No. 60/058,086 filed on Sep. 5, 1997, and assigned to the assignee of the instant invention discloses a hydrostatic weight sensor having a means for automatically regulating the amount of sensing fluid therein.

Co-pending U.S. application Ser. No. 09/003,868, hereinafter "Application ASL-186-US", entitled "Seat Weight Sensor with Means for Distributing Loads", filed on Jan. 7, 1998 claiming benefit of U.S. Provisional Application Serial No. 60/058,084 filed on Sep. 5, 1997, and assigned to the assignee of the instant invention discloses a load distributor for distributing sensed load across the load bearing surface of a hydrostatic weight sensor. Application ASL-186-US and U.S. Provisional application Ser. No. 60/058,084 are incorporated herein by reference.

Co-pending U.S. application Ser. No. 09/003,673, hereinafter "Application ASL-187-US", entitled "Seat Weight Sensor Having Self-Regulating Fluid Filled Bladder", filed on Jan. 7, 1998 claiming benefit of U.S. Provisional Application Serial No. 60/058,119 filed on Sep. 4, 1997, and assigned to the assignee of the instant invention discloses a hydrostatic weight sensor having a means for automatically regulating the amount of sensing fluid therein.

Co-pending U.S. application Ser. No. 09/003,746, hereinafter "Application ASL-194-US", entitled "Seat Weight Sensor Using Fluid Filled Tubing", filed on Jan. 7, 1998 claiming benefit of U.S. Provisional Application Serial No. 60/065,986 filed on Nov. 17, 1997, and assigned to the assignee of the instant invention discloses a hydrostatic weight sensor incorporating a fluid filled tube.

All of the above referenced U.S. Applications and U.S. Provisional Applications are incorporated herein by reference.

Co-pending U.S. application Ser. No. 09/003,744, hereinafter "Application ASL-195-US", entitled "Low Profile Hydraulic Seat Weight Sensor", filed on Jan. 7, 1998 claiming benefit of U.S. Provisional Application Serial No. 60/065,832 filed on Nov. 17, 1997, and assigned to the assignee of the instant invention discloses a hydrostatic weight sensor constructed from constructed from plates or sheets of semi-rigid material and filled with a liquid, grease, Bingham fluid or thixotropic material.

TECHNICAL ART

The instant invention generally relates to sensors and systems for measuring weight and more particularly to a weight sensor for measuring the weight of occupants and other objects in a motor vehicle seat such as useful for determining occupant seating conditions for controlling a vehicle safety restraint system.

BACKGROUND OF THE INVENTION

A vehicle may contain automatic safety restraint actuators which are activated responsive to a vehicle crash for purposes of mitigating occupant injury. Examples of such restraint actuators include air bags, seat belt pretensioners, and deployable knee bolsters.

One objective of an automatic safety restraint system is to mitigate occupant injury, thereby not causing more injury with the automatic restraint system than would be caused by the crash had the automatic restraint system not been activated. Notwithstanding the protective benefit of these automatic safety restraint actuators, there is generally both a risk and a cost associated with the deployment thereof. Generally, it is desirable to only activate automatic safety restraint actuators when needed to mitigate injury because of the expense of replacing the associated components of the safety restraint system, and because of the potential for such activations to harm occupants. This is particularly true of air bag restraint systems, wherein occupants too close to the air bag at the time of deployment—i.e. out-of-position occupants—are vulnerable to injury or death from the deploying air bag even when the associated vehicle crash is relatively mild. Moreover, occupants who are of small stature or with weak constitution, such as children, small adults or people with frail bones are particularly vulnerable to injury induced by the air bag inflator. Furthermore, infants properly secured in a normally positioned rear facing infant seat (RFIS) in proximity to a front seat passenger-side air bag are also vulnerable to injury or death from the deploying air bag because of the close proximity of the infant seat's rear surface to the air bag inflator module.

While air bags are designed to protect vehicle occupants, conventional crash detection and safety restraint deployment systems only use sensors which are mounted on the vehicle frame and are triggered by acceleration or velocity of the car rather than the occupant. Accordingly, conventional deployment strategies are not directly based on the weight, stature, and position of vehicle occupants. It is often very difficult to discriminate between crashes where air bags should be deployed and when their deployment could cause more harm than benefit. This difficult decision is typically made using only one or as few as possible sensors mounted on the vehicle. In the future, more occupant safety strategies will be available, including seat belt pre-tensioning and multi-stage air bags. With more available options, the deployment decision will become more complicated and require additional real-time occupant position data.

Air bag inflators are designed with a given restraint capacity, as for example, the capacity to protect an unbelted normally seated fiftieth percentile occupant when subjected to a 30 MPH barrier equivalent crash, which results in associated energy and power levels which can be injurious to out-of-position occupants. While relatively infrequent, cases of injury or death caused by air bag inflators in crashes for which the occupants would have otherwise survived relatively unharmed have provided the impetus to reduce or eliminate the potential for air bag inflators to injure the occupants which they are intended to protect.

One technique for mitigating injury to occupants by the air bag inflator is to reduce the power and energy levels of the associated air bag inflator, for example by reducing the amount of gas generant in the air bag inflator, or the inflation rate thereof. This reduces the risk of harm to occupants by the air bag inflator while simultaneously reducing the restraint capacity of the air bag inflator, which places occupants a greater risk for injury when exposed to higher severity crashes.

Another technique for mitigating injury to occupants by the air bag inflator is to control the rate of inflation rate or the capacity of the inflator responsive to a measure of the severity of the crash. However, the risk of injury to such occupants would not be mitigated under the conditions of higher crash severity when the inflator is intentionally made aggressive in order to provide sufficient restraint for normally positioned occupants.

Yet another technique for mitigating injury to occupants by the air bag inflator is to control the activation of the air bag inflator responsive to the presence, position, and size of the occupant, or to the severity of the crash. For example, the air bag inflator can be disabled if the occupant weight is below a given threshold. Moreover, the inflation capacity can be adjusted by controlling the number of inflation stages of a multi-stage inflator that are activated. Furthermore, the inflation power can be adjusted by controlling the time delay between the firings of respective stages of a multi-stage inflator.

One measure of restraint capacity of an air bag inflator is the amount of occupant kinetic energy that can be absorbed by the associated air bag system, whereby when the occupant collides with the gas filled air bag, the kinetic energy of the occupant is converted to potential energy via the pressurization of the air bag, and this potential energy is dissipated by venting pressurized gases from the air bag. As a vehicle in a crash is decelerated, the velocity of an unrestrained occupant relative to the vehicle increases. Preferably, the occupant restraint process is commenced early in the crash event so as to limit the amount of occupant kinetic energy which must be absorbed and thereby minimize the associated restraint forces and accelerations of and loads within the occupant. If the occupant were a simple inertial mass without friction relative to the vehicle, the kinetic energy of the occupant would be given by $\frac{1}{2} M \cdot V^2$, where M is the mass of the occupant and V is the occupant velocity relative to the vehicle. If a real occupant were represented by an interconnected set of bodies, some of which have friction relative to the vehicle, each body of which may have differing velocities relative the vehicle, the above equation would apply to the motion of the center of gravity of the occupant. Regardless of the representation, occupants of larger mass will have a larger kinetic energy for the same velocity relative to the vehicle. Therefore, an occupant weight sensor is useful in an air bag system with variable restraint capacity to enable the restraint capacity to be preferentially adapted to the weight, or mass, of the occupant.

Except for some cases of oblique or side-impact crashes, it is generally desirable to not activate an automatic safety restraint actuator if an associated occupant is not present because of the otherwise unnecessary costs and inconveniences associated with the replacement of a deployed air bag inflation system. Occupant presence can be detected by a seat weight sensor adapted to provide either a continuous measure of occupant weight or to provide a binary indication if the occupant weight is either above or below a specified weight threshold.

Known seat weight sensors comprise one or more pads employing force sensitive resistive (FSR) films. These arrangements are typically used as weight threshold systems to disable a passenger air bag when the seat is empty. Load cells attached to the seat mounting posts have also been used in research applications. Mechanisms which use string based potentiometers to measure downward seat displacement have also been investigated.

Such known arrangements suffer from several drawbacks. First, variable resistance force sensors have limited sensitivity and in some situations are not sensitive enough to put directly under a seat pad while still achieving the desired response. Second, the threshold weight system provides only very limited information. For example, such arrangements provide no indication as to the size of an occupant. Third, the resistance values of known variable force resistor change with temperature, and are subject to drift over time with a constant load on the sensor.

Furthermore, other known sensing arrangements do not otherwise provide suitable results. For example, the use of load cells is prohibitively expensive for large-scale commercial applications. Strain gauges of any type may be impractical because of the difficulty in applying them to the strained material. Mechanical string potentiometer based weight sensors are complex, and subject to failure from stretching of the string. String potentiometer based weight sensors also suffer from a limitation whereby seat geometry changes over the lifetime of the seat. More specifically, seats tend to take a "set" over time so that the springs and cushion tend to move downward as the seat ages. A string potentiometer based weight sensor measuring downward displacement would require periodic recalibration over the lifetime of the seat. Finally, optical or infrared sensors have been used to measure the spatial position of occupants relative to the dashboard or headliner. Often these sensors are also integrated with speed sensors to discern changes in occupant position due to car acceleration. Current optical and infrared occupant position sensors require augmented information from speed and weight sensors, thereby resulting in a relatively high cost distributed system which may be difficult to manufacture, install, and maintain. Furthermore, optical and/or infrared sensors which measure the range from the headliner or dashboard can be confused by placement of objects in front of an occupant, such as when reading newspapers or books, or by the position of the seat back because many seats can recline fully back and incline fully forward. Moreover, the sensing aperture of these sensors may become occluded by inadvertent scratching or substance application.

Known seat weight sensing techniques generally require multiple points for sensing distributed weight accurately. Also, force sensing resistors, load cells or membrane switches may require significant seat redesign for use in current or future seats. This is particularly true for spring type seats which do not provide a uniform horizontal support surface. The response time of load cells or membrane switches may fast enough for real-time applications.

The prior art also teaches the use of seat weight sensors outside the automotive environment, for example as a means for disabling the activation of either a boat or an industrial machine if the operator is not properly seated, or for weighing a person seated on an exercise bike. These devices employ pneumatic bladders located in the seat, whereby the pressure within the bladder is used to either activate a threshold switch or to provide a continuous indication of occupant weight.

One problem with prior art pneumatic sensors, particularly when applied to the automotive environment, is their sensitivity to environmental conditions, particularly to ambient temperature and pressure. This requires the bladder to be partially filled with fluid under ambient conditions of lower temperature or higher pressure, thereby making the bladder more susceptible to bottoming out when exposed to localized or concentrated loads and therefor requiring a means for distributing the loads over the load bearing area of the bladder. Pneumatic seat weight sensors can be sensitive to the amount of air initially in the associated bladder. A seat weight sensor in an automotive environment must function reliably and accurately over a wide range of temperatures and pressures which can cause significant errors.

The prior art also teaches the use of hydraulic load cells, wherein the weight to be measured acts upon a piston element of known area, whereby the measured weight is found by multiplying a measured pressure times the known area. One problem with hydraulic load cells in the automotive environment, particularly in a seat, is that the effects of load cell orientation on hydraulic head can introduce load measurement errors.

Application ASL-157-US discloses a fluid-filled seat weight sensor, one embodiment of which comprises a pneumatic seat weight sensor comprising a gas filled bladder mounted in the seat, a means for distributing the weight to be measured over the surface of the bladder, and a means for indicating the weight on the seat by measuring the pressure within the bladder relative to the ambient pressure. The pneumatic seat weight sensor may further comprise a means for refilling the gas within the gas-filled bladder to account for losses over time.

The gas-filled bladder is preferably only partially filled to allow for gaseous expansion due to variations in ambient temperature and pressure, such that over the possible range of environmental operating conditions the volume of the unloaded gas-filled bladder generally does not exceed the design volume thereof. Moreover, under these conditions, the associated absolute pressure in the bladder would not exceed ambient pressure.

Under the action of a distributed load, the volume of the bladder decreases until the pressure therein is sufficiently great to support the load. For a bladder having a design shape of a rectangular slab having a height and two base dimensions, as the height decreases under the action of the load, the base dimensions increase, thereby increasing the base area of the bladder. The weight of the distributed load is then given by the product of the base area of the bladder times the difference in pressure inside and outside the bladder. Even if the loading on the top of the seat is relatively localized, the associated weight is given by the differential pressure acting on the base area of the bladder, assuming the base of the bladder is fully supported and that that top surface of the bladder is not locally compressed against the bottom surface.

As noted above, the bladder is preferably only partially filled under nominal ambient conditions. Therefore, the action of a concentrated load on the bladder would most likely cause the top surface of the bladder to bottom out on the bottom surface. This prevents a portion of the load from being supported by the gas within the bladder so that the corresponding differential pressure measurement would not properly indicate the full weight on the bladder. This condition can be alleviated by providing a means for distributing the load across the bladder, such as with the foam pad constituting the seat cushion, or the system and method disclosed in Application ASL-186-US.

Generally, the sensitivity of the gas filled bladder to ambient temperature and pressure is decreased with decreasing amounts of gas in the bladder, and with decreasing bladder thickness for the same base dimensions of the bladder. However, as the bladder is made thinner in overall height, and the amount of gas is reduced, the bladder becomes more susceptible to bottoming-out under the influence of localized loads applied to the seat.

The gas-filled bladder may be of sealed construction with a fixed initial amount of gas. Alternately, the bladder may be equipped with a filling valve to refill gas that is lost to either osmosis or leakage, for example in accordance with Application ASL-163-US. Furthermore, the bladder may be equipped with a means to automatically refill this lost gas with the preferable amount of gas relative to the design volume of the bladder, generally about 30% to 50% of the design volume, and more particularly about 40%; for example in accordance with Applications ASL-186-US or ASL-187-US.

When incorporating a means for automatically refilling the bladder, the amount of gas in the bladder at any given time would likely not be known. The weight on the sensor is given by the expression $W=DP/A$, where DP is the differential pressure between the inside and outside of the bladder, and A is the base area of the bladder. The effect of the base area A of a partially filled bladder increasing with increasing load is included in the calibration. This effect is smaller for relatively thinner bladders, and is relatively insensitive to the fill conditions of the bladder.

If a pneumatic hydrostatic weight sensor not maintained in the proper partially filled state, then under some conditions, such as when the pneumatic hydrostatic weight sensor is used at a sufficiently greater temperature or reduced pressure relative to the corresponding temperature or pressure during fill conditions, then the gas in the gas-filled bladder can expand to exceed the design volume thereof, whereby a portion of the force resulting from the gas pressure therein is counteracted by internal membrane forces of the bladder. Consequently, under these conditions a resulting measure of the pressure differential across the gas-filled bladder would not entirely correlate with the applied weight so that a measure of weight based upon this differential pressure would not accurately indicate the amount of weight applied to the seat.

Another source of pneumatic hydrostatic weight sensor measurement error are alternate load paths by which a portion of the weight applied to the seat is supported by some means other than the pressure in the gas-filled bladder.

For example, if the load bearing area of the gas-filled bladder were smaller than that of the seat, then those portions of the seat assembly adjacent the gas-filled bladder provide an alternate load path. As another example, media or mechanisms incorporated in the gas-filled bladder to restore and regulate the volume of gas therein also provides an alternate load path when the weight applied to the gas-filled bladder is sufficiently great to compress the volume restoring media or mechanisms.

One possible failure mode of a pneumatic hydrostatic weight sensor is the loss of gas from the gas-filled bladder, whereby corresponding differential pressure measurement would always indicate zero applied weight. Accordingly, the gas containing elements of the pneumatic hydrostatic weight sensor must be constructed ruggedly so as to work reliably over the expected life span. Moreover, the reliability of the associated system incorporating the pneumatic hydrostatic weight sensor could be enhanced by incorporating a separate means to detect whether the gas-filled bladder is evacuated.

SUMMARY OF THE INVENTION

The instant invention overcomes the above-noted problems by providing a system and method for compensating for the effects of ambient temperature or pressure on a pneumatic hydrostatic weight sensor. The instant invention also provides a system and method for detecting if the gas-filled bladder of a pneumatic hydrostatic weight sensor has become evacuated.

In accordance with the instant invention, a hydrostatic weight sensor comprises a deformable confinement that contains a fluid, wherein the deformable confinement may constitute either a distinct chamber, or one chamber of a multi-chamber deformable confinement. The hydrostatic weight sensor further comprises either a pressure sensor operatively coupled to the deformable confinement for sensing the pressure of the fluid contained therein, or an means for operatively coupling a pressure sensor to the deformable confinement. The hydrostatic weight sensor may also comprise one or more of the following elements: 1) a means for replenishing the fluid within the deformable confinement, 2) a means for releasing excessive fluid from the deformable confinement, or 3) a means for regulating the amount of fluid within the deformable confinement. The fluid contained by the deformable confinement may comprise either a gas, a liquid, a Bingham fluid, or a thixotropic material. Various types of pressure sensors may be incorporated into or associated with the hydrostatic weight sensor in accordance with the instant invention. For example, the pressure sensor may sense either the absolute pressure of the fluid within the deformable confinement, or the difference between the pressure thereof and the local atmospheric pressure. Furthermore, the pressure sensor may be either internal or external to the hydrostatic weight sensor, may be integrated therewith or separated therefrom, and may operate on any principles known to one of ordinary skill in the art, including the measurement of strain in the surface of the deformable confinement, or the measurement of pressure through the surface of the deformable confinement whereby the pressure sensor is isolated thereby from the fluid. Examples of various hydrostatic weight sensors in accordance with the instant invention are disclosed hereinbelow and in Applications ASL-157-US, ASL-163-US, ASL-185-US, ASL-187-US, ASL-193-US, ASL-194-US, and ASL-195-US referenced hereinabove and incorporated herein by reference.

In further accordance with the instant invention, a load distributor comprises a means for distributing the load applied to a hydrostatic weight sensor across one or more load bearing surfaces of the hydrostatic weight sensor. A hydrostatic weight sensor is preferably partially filled with fluid, particularly for fluids such as gases that are subject to expansion under the influence of ambient temperature and pressure conditions. A partially filled hydrostatic weight sensor is susceptible to bottoming out under the influence of concentrated loads unless a means is provided for distributing the applied load across the load bearing surfaces of the hydrostatic weight sensor. The seat cushion inherently acts as a load distributor but is subject to localized deformation under the influence of loads that are sufficiently great or sufficiently concentrated. A load distributor preferably is both sufficiently rigid to prevent concentrated loads from causing localized deformations of sufficient magnitude to locally collapse the hydrostatic weight sensor, and sufficiently flexible so as to not interfere with seating comfort. Examples of various load distributors in accordance with the instant invention are disclosed in Applications ASL-157 and ASL-186 referenced hereinabove and incorporated herein by reference.

The instant invention comprises a pair of gas-filled hydrostatic weight sensors of substantially equal area and weight bearing contour located on top of one another in the seat. Furthermore, the pair of gas-filled bladders functions as a pneumatic hydrostatic weight sensor, wherein the individual gas-filled bladders are placed in series with the applied load so that each gas-filled bladder senses the same load distribution. The weight of the occupant is applied to the top surface of the upper gas-filled bladder through an upper load distribution layer in or of the seat, then to the bottom surface thereof by the pressure within the upper bladder, then to the top surface of the lower gas-filled bladder which supports the upper gas-filled bladder, then to the bottom surface thereof by the pressure within the lower bladder, and finally to a lower load distribution layer in or of the seat. Each gas-filled bladder in the pair senses substantially the same load distribution.

Even if the load applied to the seat were localized, if all of the load is carried by the top surface of the associated gas-filled bladder—i.e. the load is neither sufficiently great nor sufficiently concentrated so as to cause the top surface of the gas-filled bladder to bottom out against the bottom surface thereof,—then, assuming that the base of the bladder is fully supported, the amount of load carried by the gas-filled bladder is given by the product of the pressure differential across the bladder times the base area of the bladder.

If each of the gas-filled bladders in the pair has a similar area, then the pressure differentials measured across each respective bladder will be similar for all types of weight distributions. This characteristic is the basis for diagnosing a leaking gas-filled bladder on the basis that a leakage in one of the two bladders causes a significant difference between the differential pressure measurements from each of the associated gas-filled bladders.

Each of the gas-filled bladders preferably incorporates a means for maintaining and regulating the amount of gas in the gas-filled bladder so that the gas-filled bladder is partially filled when the pneumatic hydrostatic weight sensor is in an unloaded condition so as to minimize sensitivity to changes in environmental conditions. Notwithstanding this, a pneumatic hydrostatic weight sensor is most accurate when used under the same environmental conditions of temperature and pressure—particularly pressure—as when the gas-filled bladder was filled. In the process of filling the gas-filled bladder, the conditions of the gas inside the bladder become the same as those of the air outside the bladder.

The pneumatic hydrostatic weight sensor is subject to error when used under environment conditions different from the fill conditions. For example, the measured pressure differential corresponding to a given applied weight increases with decreasing ambient pressure, and with increasing ambient temperature. The degree to which the measured pressure differential is sensitive to changes in ambient conditions is dependent upon the geometry of the associated gas-filled bladder, and the relative amount of gas therein. More particularly, the sensitivity of the gas-filled bladder to temperature changes increases with increasing bladder thickness.

One aspect of the instant invention incorporates a pair of gas-filled bladders each of different thickness, whereby the individual gas-filled bladders exhibit different sensitivity to changes in ambient pressure and temperature conditions so that difference between the differential pressure measurements from the separate gas-filled bladders is related to the change in ambient pressure or temperature relative to that of the fill conditions. This difference in the differential pressure measurements is then used to compensate for the effects of ambient pressure and temperature on the corresponding weight measurement, so as to improve the accuracy of the pneumatic hydrostatic weight sensor.

Another aspect of the instant invention incorporates a pair of gas-filled bladders whereby the relative amount of gas in each bladder is adjusted to provide a similar difference in sensitivities of differential pressure measurement to changes in ambient pressure and temperature conditions.

Accordingly, one object of the instant invention is to provide an improved seat weight sensor which provides a consistent and accurate measure of the seat loading over a wide range of ambient temperature and pressure conditions.

A further object of the instant invention is to provide an improved seat weight sensor which provides a consistent and accurate measure of the seat loading independent of the location of the source of weight on the seat.

A yet further object of the instant invention is to provide an improved seat weight sensor which provides a consistent and accurate measure of the seat loading independent of the size and distribution of the source of weight on the seat.

A yet further object of the instant invention is to provide an improved seat weight sensor which provides a consistent and accurate measure of the seat loading independent of the amount of weight on the seat.

A yet further object of the instant invention is to provide an improved seat weight sensor which can distinguish between a rear facing infant seat, for which an air bag system is preferably not deployed, and other occupants for which an air bag system is preferably deployed in the event of a crash of sufficient severity.

A yet further object of the instant invention is to provide an improved seat weight sensor which can be incorporated into an intelligent safety restraint system for which the preferable mode of the activation of a controllable occupant restraint system is dependent upon the weight of the occupant.

A yet further object of the instant invention is to provide an improved seat weight sensor which is reliable.

A yet further object of the instant invention is to provide an improved seat weight sensor which does not interfere with occupant comfort.

A yet further object of the instant invention is to provide an improved seat weight sensor which is insensitive to the orientation of the seat.

A yet further object of the instant invention is to provide an improved seat weight sensor which is inexpensive to produce.

In accordance with these objectives, one feature of the instant invention is the incorporation of a tandem pair of gas-filled bladders mounted in the base of the seat, whereby the gas-filled bladders are on top of one another and have substantially the same weight-bearing area and contour.

Another feature of the instant invention are a pair of differential pressure sensors each operatively coupled to an associated gas-filled bladder for measuring the pressure therein relative to local atmospheric pressure.

Yet another feature of the instant invention is the incorporation of a means for compensating the effects of ambient temperature and pressure in accordance with the difference between the differential pressure measurements from each of the associated gas-filled bladders.

Yet another feature of the instant invention is that under conditions of standard pressure and temperature, the bladders are each only partially filled.

Yet another feature of the instant invention is the incorporation of the gas-filled bladder below the seat cushion wherein the seat cushion acts to distribute the seat load across the surface of the bladder.

Yet another feature of the instant invention are a pair of differential pressure sensors, one operatively coupled to one of gas-filled bladder for measuring the pressure therein relative to local atmospheric pressure, the other operatively coupled to both of the gas-filled bladders for measuring the difference in pressure therebetween.

The specific features of the instant invention provide a number of associated advantages. One advantage of the instant invention with respect to the prior art is that the separate differential pressure measurements provide sufficient information to determine the applied weight while also compensating for the effects variations in the ambient conditions of pressure and temperature relative to those ambient conditions when the associated gas-filled bladders were filled.

Another advantage of the instant invention is that the gas-filled bladder is responsive to loads over a large area of the seat without regards to the distribution or amount of loading.

Yet another advantage of the instant invention is that the maintenance of each of the associated gas-filled bladders in a partially filled state improves the consistency and accuracy of weight measurements over a wide range of ambient pressures and temperatures.

Yet another advantage of the instant invention is that the seat weight sensor thereof can enable a rear facing infant seat to be distinguished from an occupant for which the air bag system is preferably deployed.

Yet another advantage of the instant invention is that the seat weight sensor thereof is sufficiently robust and accurate to enable associated occupant weight dependent control of a controllable occupant restraint system.

Accordingly, the instant invention provides an improved seat weight sensor which is relatively insensitive to the effects of ambient temperature and pressure; which is simple in construction and relatively robust and reliable in operation; which can be readily incorporated into an automotive seat without interfering with occupant comfort; and which can be produced relatively inexpensively.

These and other objects, features and advantages of the instant invention will be more fully understood after reading the following detailed description of the preferred embodiment with reference to the accompanying drawings. While this description will illustrate the application of the instant invention in an automotive safety restraint system, it will be understood by one with ordinary skill in the art that the instant invention can also be applied to other systems for weighing objects.

DETAILED DESCRIPTION OF THE PREFERRED EMBODIMENT(S)

Figure 1:
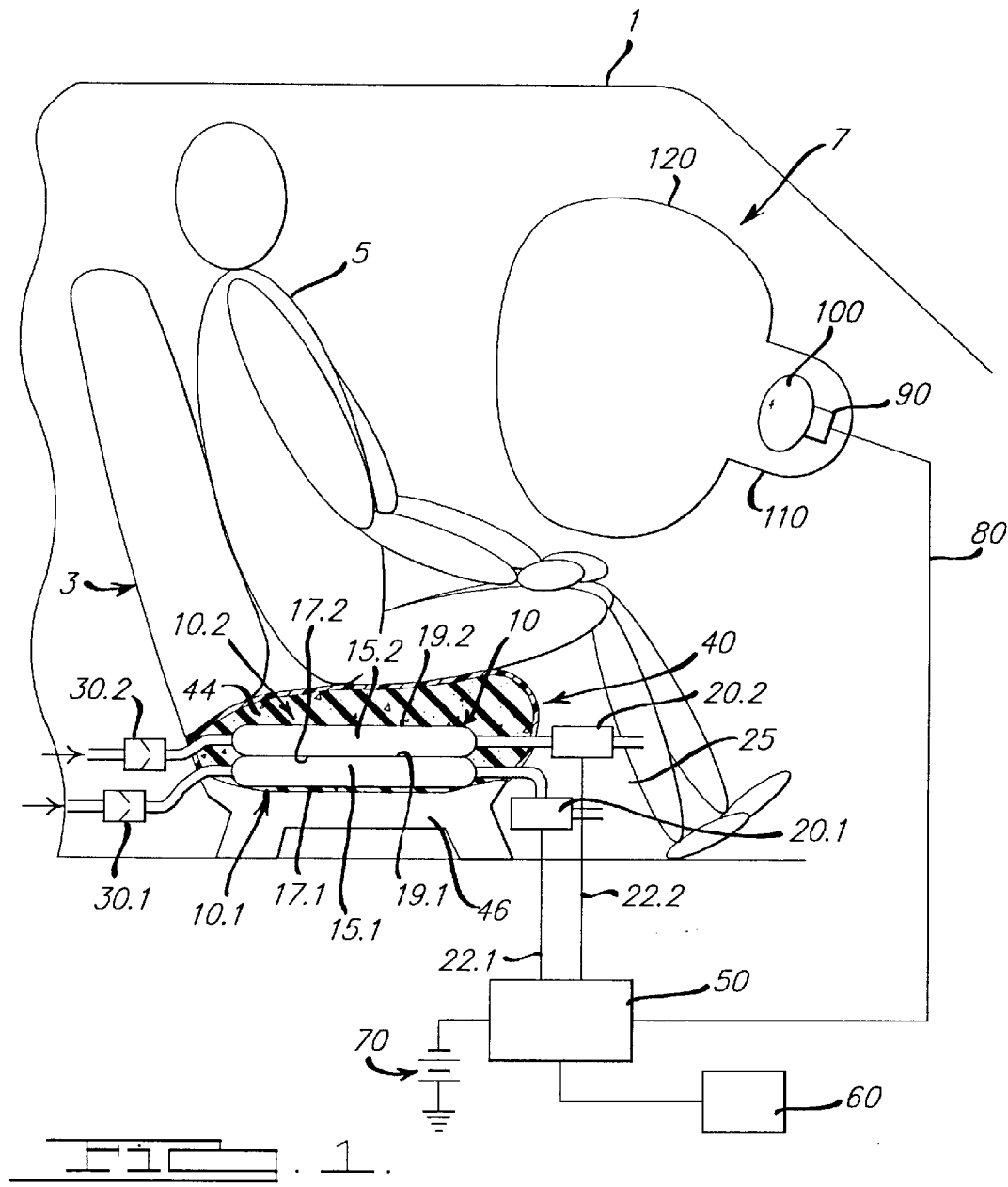
FIG. 1 illustrates one possible environment of the instant invention.
Figure 2:
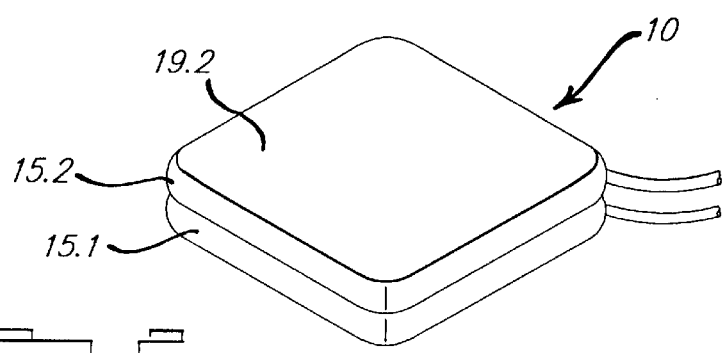
FIG. 2 illustrates the arrangement of gas-filled bladders incorporated in the instant invention.

Referring to FIG. 1, a seat 3 in a motor vehicle 1 incorporates a pneumatic hydrostatic weight sensor 10 mounted in the seat base 40. The pneumatic hydrostatic weight sensor 10 incorporates a pair of fluid-filled bladders 15.1 and 15.2 which are disposed on top of one another as illustrated in FIG. 2, more particularly with bladder 15.1 disposed adjacent to and above bladder 15.2. The respective bladders 15.1 and 15.2 have substantially the same load bearing area with substantially the same contours which are substantially aligned with one another. The pair of fluid-filled bladders 15.1 and 15.2 is sandwiched between the seat frame 46 below and the seat cushion foam 44 above.

Each of the bladders 15.1 and 15.2 individually function in accordance with the invention disclosed in Application ASL-157-US, which is incorporated herein by reference.

Bladder 15.1 is operatively coupled to check valve 30.1 which admits air into the bladder 15.1 when the pressure of the atmosphere 25 exceeds that of the gas inside bladder 15.1, generally responsive to a means internal to the bladder 15.1 for regulating the amount of fluid in the bladder 15.1. Bladder 15.1 is also operatively coupled to differential pressure sensor 20.1 which measures the difference in pressure between the pressure of the gas inside bladder 15.1 and that of the atmosphere 25.

Similarly, bladder 15.2 is operatively coupled to check valve 30.2 which admits air into the bladder 15.2 when the pressure of the atmosphere 25 exceeds that of the gas inside bladder 15.2, generally responsive to a means internal to the bladder 15.2 for regulating the amount of fluid in the bladder 15.2. Bladder 15.2 is also operatively coupled to differential pressure sensor 20.2 which measures the difference in pressure between the pressure of the gas inside bladder 15.2 and that of the atmosphere 25.

In operation, an occupant 5 seated on the base 40 of seat 3 creates a loading on the seat cushion foam 44 which is transferred to the top 19.2 of bladder 15.2, thereby causing the pressure inside the bladder 15.2 to increase such that that product of the differential pressure, as sensed by differential pressure sensor 20.2, multiplied times the area of the base 17.2 of the bladder 15.2 is equal to the total weight distributed by the seat cushion foam 44 over the top 19.2 of the bladder 15.2. The resulting pressure force acting on the base 17.2 of the bladder 15.2 is then transferred to the top 19.1 of bladder 15.1, thereby similarly causing the pressure inside the bladder 15.1 to increase such that that product of the differential pressure, as sensed by differential pressure sensor 20.1, multiplied times the area of the base 17.1 of the bladder 15.1 is equal to the total weight distributed by base 17.1 of bladder 15.1 over the seat frame 46.

Bladders 15.1 and 15.2 are preferably each only partially filled with gas so that over the expected range of ambient temperatures and pressure in either bladder 15.1 or 15.2 when unloaded does not exceed ambient pressure. For example, Applications ASL-163-US, ASL-185-US and ASL-187-US which are incorporated herein by reference disclose systems and methods for individually maintaining bladders 15.1 and 15.2 in such a partially filled state.

The pressure signal outputs 22.1 and 22.2 from respective differential pressure sensors 20.1 and 20.2 are operatively coupled to an signal processor 50 which converts the pressure signal outputs 22.1 and 22.2 to a measure of occupant weight using known analog, digital, or microprocessor circuitry and software. A crash sensor 60 is also operatively coupled to the signal processor 50. Responsive to a crash detected by the crash sensor 60, and further responsive to the sensed weight of the occupant as transformed from the pressure signal outputs 22.1 and 22.2, the signal processor 50 generates a signal 80 which is operatively coupled to one or more initiators 90 of one or more gas generators 100 mounted in an air bag inflator module 110, thereby controlling the activation of the air bag inflator module assembly 7 so as to inflate the air bag 120 as necessary to protect the occupant 5 from injury which might otherwise be caused by the crash. The electrical power necessary to carry out these operations is provided by a source of power 70, preferably the vehicle battery.

Accordingly, the pneumatic hydrostatic weight sensor 10 comprises two component pneumatic hydrostatic weight sensors 10.1, 10.2.

For a given gas-filled bladder, the pressure differential across the bladder is a function of the applied weight, the change in environmental conditions of pressure and temperature since the bladder was filled, the geometry of the bladder, and the relative amount of gas within the bladder. Generally, the measured pressure differential for each of two different bladders with the same applied weight distribution will be substantially the same if the individual bladders have substantially the same weight bearing area, and if the environmental conditions are similar to those present when the bladders were filled with gas. For a given weight distribution applied to a given bladder having a given relative amount of gas, the pressure differential increases with either decreasing ambient pressure or increasing ambient temperature relative to the corresponding ambient pressure or temperature when the bladder was filled.

Figure 3:
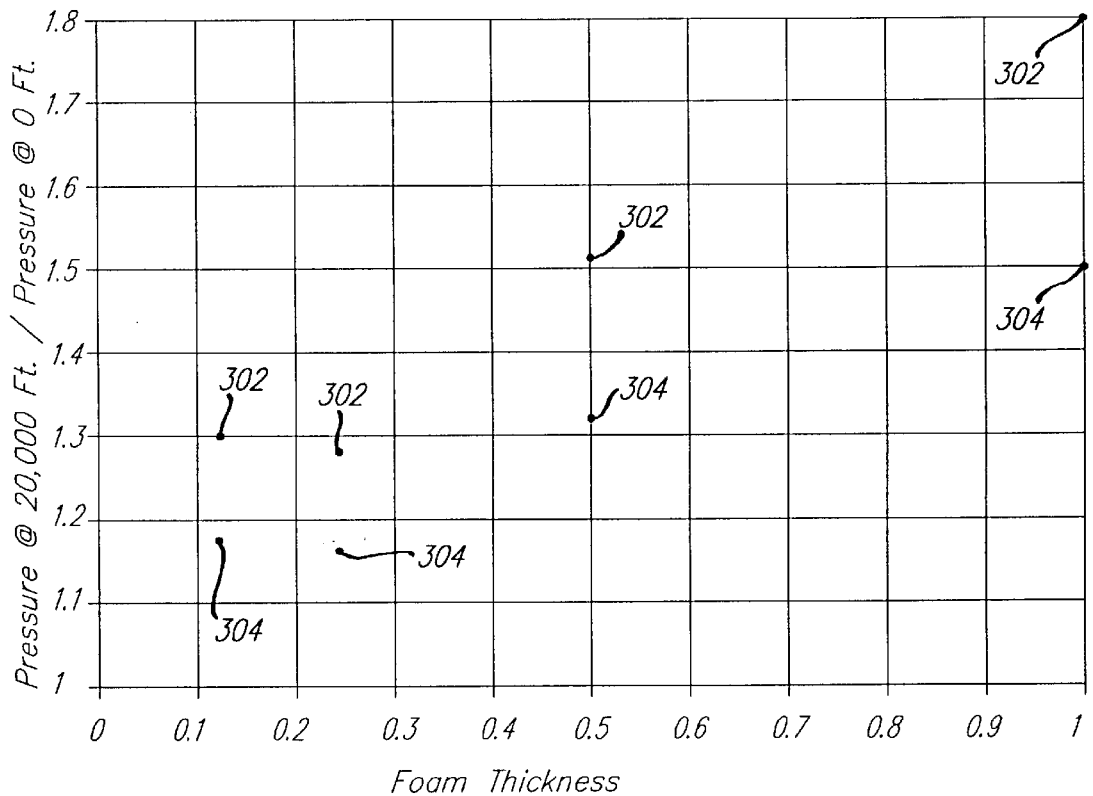
FIG. 3 illustrates a graph showing the effect of the thickness of the gas-filled bladder on the sensitivity of the associated differential pressure measurement to a change in ambient pressure for a given applied weight.

However, as illustrated in FIG. 3, the sensitivity of the pressure differential to changes in ambient pressure or temperature conditions is dependent upon both the bladder geometry and the relative amount of gas within the bladder. More particularly, FIG. 3 shows the ratio of measured pressure differential for an ambient pressure equivalent to a 20,000 ft. altitude to the measured pressure differential at sea level as a function of the unloaded thickness of the bladder expressed in inches for bladders of two different load bearing areas, whereby data points 302 correspond to a bladder with a square load bearing area of 10" by 10", and data points 304 correspond to a bladder with a square load bearing area of 14" by 14". The thickness of the bladder is controlled by a foam core contained therein which acts to expand the bladder to an initial volume and thereby incorporate an associated amount of gas.

As noted above, the pressurization of a gas-filled bladder can result from either a weight applied to the bladder, or due to thermodynamic expansion of the gas therein resulting from changes in gas temperature or ambient pressure. Therefore, the differential pressure DP measured across the bladder can be expressed as:

$$DP = P_W + P_{ERR} \quad (1)$$

where $P_W$ is the weight bearing component of pressure and $P_{ERR}$ is an additional thermodynamic contribution of pressure which causes an associated corresponding weight measurement error. For a bladder that is partially filled at ambient conditions with no applied load, $P_{ERR}$ is zero. For an unloaded bladder, $P_W$ will be zero. For ambient conditions which differ from the fill conditions, the ratio of $P_{ERR}$ for a 1" thick bladder to $P_{ERR}$ for a 0.25" thick bladder is about 2.8. Therefore, if one of bladders 15.1 or 15.2 is 1" thick, and the other of bladders 15.1 or 15.2 is 0.25" thick, the weight bearing component of pressure is given by:

$$P_W = (2.8\ DP_{0.25"} - DP_{1"})/1.8 \quad (2)$$

where $DP_{0.25"}$ is the differential pressure measurement from the 0.25" thick bladder, and $DP_{1"}$ is the differential pressure measurement from the 1" thick bladder. The corresponding weight W on the pneumatic hydrostatic weight sensor 10 is then given by:

$$W = P_W * A \quad (3)$$

where A is the load bearing area of bladders 15.1 and 15.2.

The calculation of seat weight is carried out by signal processor 50 in accordance with equations (2) and (3) using known methods of calculation. While equations (2) and (3) represent a simplified relationship which can be used to compensate for the effects of changes in ambient pressure, it is anticipated that other more complex relationships may be developed in accordance with the teachings of the instant invention using data analysis and modeling techniques known to one of ordinary skill in the art without departing from the scope of the instant invention.

Figure 4:
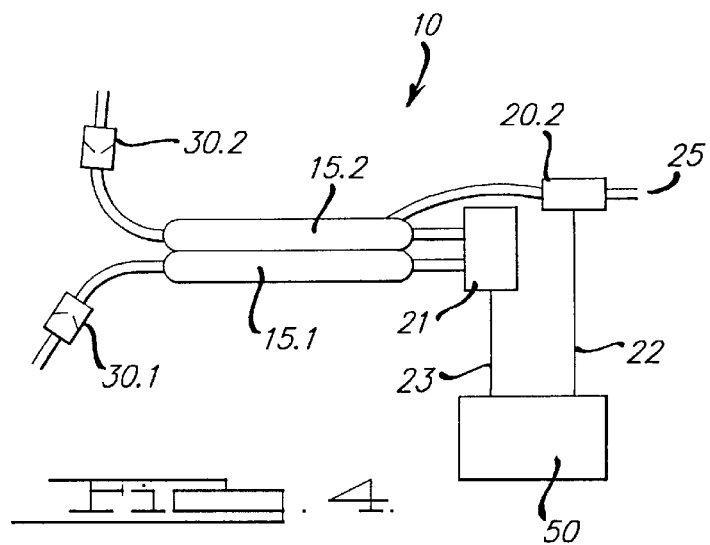
FIG. 4 illustrates an alternate arrangement in accordance with the instant invention for sensing differential pressures of the gas-filled bladders incorporated into the instant invention.

FIG. 4 illustrates an alternate arrangement for measuring the pressures of bladders 15.1 and 15.2, whereby differential pressure sensor 20.2 measures the differential pressure across bladder 15.2, and differential pressure sensor 21 measures the differential pressure between bladders 15.1 and 15.2, and the measurement of weight W on the pneumatic hydrostatic weight sensor 10 is calculated by signal processor 50 from corresponding differential pressure signals 22.2 and 23 in accordance with a rearrangement of equations (2) and (3).

The separate differential pressure signals 22.1 and 22.2 or 22.2 and 23 can be used to diagnose if one of bladders 15.1 or 15.2 has a leakage which would cause a respective pair of differential pressure signals 22.1 and 22.2 or 22.2 and 23 to differ by more than an amount which could otherwise be attributable to changes in ambient pressure or temperature.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:

1. A system for sensing the weight of an occupant on a vehicle seat, comprising:
    a. a plurality of hydrostatic weight sensors locatable in a vehicle seat in series with one another in a load path of weight measurement;
    b. a plurality of pressure sensors for generating associated signals responsive to the pressure within said hydrostatic weight sensors responsive to the weight of the occupant on the vehicle seat; and
    c. a signal processor for measuring the pressure within said hydrostatic weight sensors and the weight of the occupant on the vehicle seat responsive to said signals, whereby said signal processor is also responsive to a difference in pressure between the associated pressures of two of said plurality of hydrostatic weight sensors so as to compensate for the effects of ambient conditions on said signals.

2. A system for sensing the weight of an occupant on a vehicle seat as recited in claim 1, wherein said ambient condition is ambient pressure.

3. A system for sensing the weight of an occupant on a vehicle seat as recited in claim 1, wherein said ambient condition is ambient temperature.

4. A system for sensing the weight of an occupant on a vehicle seat as recited in claim 1, wherein each of said pressure sensors is responsive to the difference in pressure between the pressure of an associated hydrostatic weight sensor and the ambient atmospheric pressure.

5. A system for sensing the weight of an occupant on a vehicle seat as recited in claim 1, wherein one of said pressure sensors is responsive to the difference in pressure between the pressures of two of the hydrostatic weight sensors.

6. A system for sensing the weight of an occupant on a vehicle seat as recited in claim 1, further comprising a load distributor adjacent at least one of the load bearing surfaces of said hydrostatic weight sensors.

7. A method of sensing the weight of an occupant on a vehicle seat, comprising:
    a. interposing a plurality of hydrostatic weight sensors in series with a load path which supports the occupant in the vehicle seat, whereby the pressure within each of said hydrostatic weight sensors is responsive to the weight of the occupant on the vehicle seat;
    b. measuring the pressure within each of said hydrostatic weight sensors;
    c. measuring the difference in pressure between two of said hydrostatic weight sensors;
    d. generating a measure responsive to the weight of the occupant from one or more of said measurements of pressure; and
    e. compensating for error in said measure responsive to said measurement of difference in pressure.

8. A method of sensing the weight of an occupant on a vehicle seat as recited in claim 7, whereby the operation of compensating for error in said measure compensates for the effects of ambient pressure on said weight measure.

9. A method of sensing the weight of an occupant on a vehicle seat as recited in claim 7, whereby the operation of compensating for error in said measure compensates for the effects of ambient temperature on said weight measure.

* * * * *